US012801965B2

(12) United States Patent
Lee et al.

(10) Patent No.: US 12,801,965 B2
(45) Date of Patent: Nov. 17, 2026

(54) QUANTUM MACHINE LEARNING BASED ON SEQUENTIAL MEASUREMENTS IN QUANTUM CLUSTER STATES

(71) Applicant: International Business Machines Corporation, Armonk, NY (US)

(72) Inventors: Chee-Kong Lee, Tacoma, WA (US); Jae-Eun Park, Wappingers Falls, NY (US); Brian Leo Quanz, Yorktown Heights, NY (US); Vaibhaw Kumar, Frederick, MD (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 18/214,059

(22) Filed: Jun. 26, 2023

(65) Prior Publication Data

US 2024/0428108 A1 Dec. 26, 2024

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS 11,521,104 B2 12/2022 Delfosse et al.
2022/0199888 A1 6/2022 Daraeizadeh et al.
2022/0269963 A1 8/2022 Delfosse et al.
2022/0383175 A1 12/2022 Gimeno-Segovia et al.

FOREIGN PATENT DOCUMENTS

CN 114358318 B 4/2022
CN 114500337 A 5/2022
WO 2022106003 A1 5/2022
(Continued)

OTHER PUBLICATIONS

Ferguson et al., Measurement-Based Variational Quantum Eigensolver; Phys. Rev. Lett. 126, 220501—Published Jun. 1, 2021; Total pp. 7 (Year: 2021).*

(Continued)

*Primary Examiner* — Alan Chen
(74) *Attorney, Agent, or Firm* — SCULLY, SCOTT, MURPHY & PRESSER, P.C.; Joseph P. Curcuru

(57) ABSTRACT

Systems and methods for quantum machine learning are described. A plurality of qubits can be entangled to create a cluster state. The plurality of qubits can include at least an input qubit, an output qubit, and at least one ancilla qubit. The input qubit can represent data among a training data set of a machine learning model represented by a unitary operation. Sequential local measurements of the cluster state can be performed to generate a plurality of measurement outcomes. At least one of the plurality of qubits can be rotated according to the plurality of measurement outcomes and rotation parameters of the unitary operation. The sequential local measurements and rotation of the plurality of qubits can transform an input state of the input qubit into an output state of the output qubit. The machine learning model can be trained based on the output state of the output qubit.

20 Claims, 6 Drawing Sheets

600

(56) References Cited

FOREIGN PATENT DOCUMENTS

| | | | |
|---|---|---|---|
| WO | 2022148839 | A1 | 7/2022 |
| WO | 2022159847 | A1 | 7/2022 |

OTHER PUBLICATIONS

Jerbi et al., Quantum machine learning beyond kernel methods; Nature Communications | ( 2023)1 4:517; Published Jan. 18, 2023; Total pp. 8 (Year: 2023).*

Cerezo et al., Variational quantum algorithms; arXiv: 2012.09265v2 [quant-ph] Oct. 4, 2021; Total pp. 33 Total (Year: 2021).*

Ferguson et al,"A measurement-based variational quatum eigensolver-",Ref: Phys. Rev. Lett. 126, 220501 Mar. 15, 2021. 11 pages. https://arxiv.org/abs/2010.13940.

Raussendorf et al,"A One-Way Quantum Computer", DOI: 10.1103/PhysRevLett.86.5188,Physical Review Letters,vol. 86,No. 22. May 28, 2001.5 pages. https://www.researchgate.net/profile/Robert-Raussendorf/publication/11955500_A_One-Way_Quantum_Computer/links/56a7c8e108aeded22e370363/A-One-Way-Quantum-Computer.pdf.

No Author. "Start Building Your First Machine Learning Project With This Famous Dataset", retrieved from web https://web.archive.org/web/20210514135216/https://analyticsindiamag.com/start-building-first-machine-learning-project-famous-dataset/, May 14, 2021, 16 pages.

Raussendorf et al. "Measurement-based quantum computation on cluster states." Physical review A 68, Jan. 14, 2003, 37 pages.

* cited by examiner

300

400

500

QUANTUM MACHINE LEARNING BASED ON SEQUENTIAL MEASUREMENTS IN QUANTUM CLUSTER STATES

BACKGROUND

The present application relates generally to computers and computer applications, and more particularly to quantum computers, quantum algorithms and quantum machine learning.

Computers can be implemented under architecture that may include processing elements fabricated using semiconductor materials and technology, semiconductor memory devices, and magnetic or solid-state storage devices. Classical computers encode information in bits, where each bit can represent a value of 1 or 0. These 1s and 0s act as on/off switches that drive classical computer functions. If there are n bits of data, then there are $2^n$ possible classical states, and one state is represented at a time.

Quantum computers use quantum processors that operate on data represented by quantum bits, also known as qubits. One qubit can represent the classical binary states ‘0’, ‘1’, and also additional states that are superpositions of ‘0’ and ‘1’. Due to the ability to represent superpositions of ‘0’ and ‘1’, a qubit can represent both ‘0’ and ‘1’ states at the same time. For example, if there are n bits of data, then 2n quantum states can be represented at the same time. Further, qubits in a superposition can be correlated with each other, referred to as entanglement, where the state of one qubit (whether it is a 1 or a 0 or both) can depend on the state of another qubit, and more information can be encoded within the two entangled qubits. Based on superposition and entanglement principles, qubits can enable quantum computers to perform functions that may be relatively complex and time consuming for classical computers.

BRIEF SUMMARY

The summary of the disclosure is given to aid understanding of a computer system and method of quantum machine learning, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In one embodiment, a method for quantum machine learning is generally described. The method can include entangling a plurality of qubits to create a cluster state. The plurality of qubits can include at least an input qubit, an output qubit, and at least one ancilla qubit. The input qubit can represent data among a training data set of a machine learning model represented by a unitary operation. The method can further include performing sequential local measurements of the cluster state to generate a plurality of measurement outcomes. The method can further include rotating at least one of the plurality of qubits according to the plurality of measurement outcomes and rotation parameters of the unitary operation. The sequential local measurements and rotating at least one of the plurality of qubits can transform an input state of the input qubit into an output state of the output qubit. The method can further include training the machine learning model based on the output state of the output qubit.

A system for quantum machine learning is generally described. The system can include at least one processor and quantum hardware including a plurality of qubits. The quantum hardware can be configured to entangle a plurality of qubits to create a cluster state. The plurality of qubits can includes at least an input qubit, an output qubit, and at least one ancilla qubit. The input qubit can represent data among a training data set of a machine learning model represented by a unitary operation. The quantum hardware can be further configured to perform sequential local measurements of the cluster state to generate a plurality of measurement outcomes. The quantum hardware can be further configured to rotate at least one of the plurality of qubits according to the plurality of measurement outcomes and rotation parameters of the unitary operation. The at least one processor can be configured to control the quantum hardware to transform an input state of the input qubit into an output state of the output qubit. The at least one processor can be further configured to train the machine learning model based on the output state of the output qubit.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
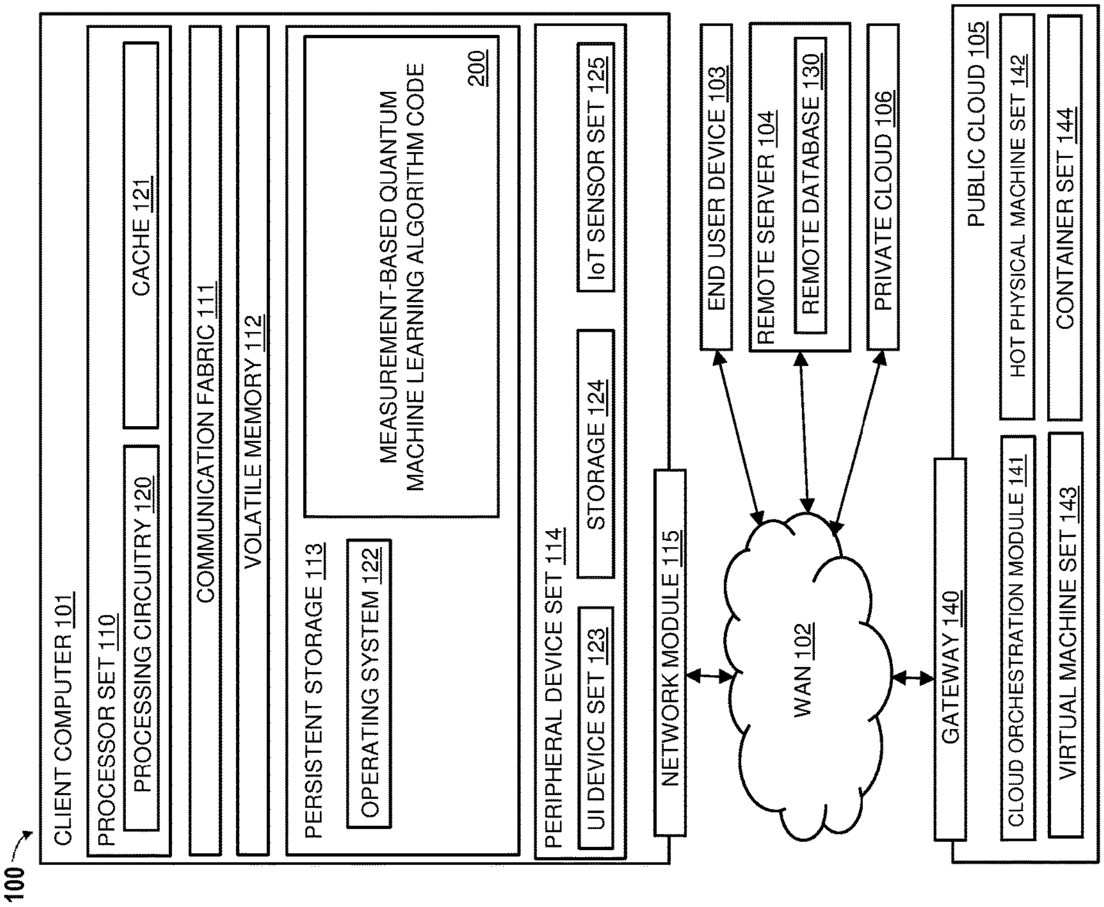
FIG. 1 is a block diagram illustrating a computing environment which may facilitate measurement-based quantum machine learning in an embodiment.

According to an aspect of the invention, there is provided a method for quantum machine learning. The method can include entangling a plurality of qubits to create a cluster state. The plurality of qubits can include at least an input qubit, an output qubit, and at least one ancilla qubit. The input qubit can represent data among a training data set of a machine learning model represented by a unitary operation. The method can further include performing sequential local measurements of the cluster state to generate a plurality of measurement outcomes. The method can further include rotating at least one of the plurality of qubits according to the plurality of measurement outcomes and rotation parameters of the unitary operation. The sequential local measurements and rotating at least one of the plurality of qubits can transform an input state of the input qubit into an output state of the output qubit. The method can further include training the machine learning model based on the output state of the output qubit.

Advantageously, the method in an aspect can perform measurement-based quantum machine learning that is ansatz independent, automatically selects optimal unitary rotation during optimization, reduces circuit depth, and create different unitary operations depending on sequential local measurements for separating different classes.

One or more of the following aspects or features can be separable or optional from each other in one or more embodiments.

In another aspect, the training of the machine learning model can include optimizing the rotation parameters of the unitary operation. The optimization of the rotation parameters of the unitary operation can automatically select the best unitary rotation to avoid barren plateaus issues.

Yet in another aspect, the optimizing of the rotation parameters can include measuring the output state of the output qubit to obtain an output, using a cost function to determine a score associated with the output and tuning the rotation parameters of the unitary operation based on the score. The optimization of the rotation parameters using the cost function can improve a prediction accuracy of the machine learning model.

Yet in another aspect, the entangling of the plurality of qubits to create the cluster state can include using a plurality of controlled-Z gates to entangle the plurality of qubits. Using controlled-Z gates to entangle the plurality of qubits to create the cluster state can provide a shallower circuit depth compared to gate-based models.

Yet in another aspect, the sequential local measurement of the cluster state can include measuring the input qubit to obtain a first measurement outcome, measuring a first ancilla qubit among the at least one ancilla qubit to obtain a second measurement outcome. The first ancilla qubit can be measured using a measurement angle that depends on the first measurement outcome and the first ancilla qubit succeeds the input qubit in the cluster state. The sequential measurement can create different unitary operations, hence different gate operations can be applied to separate different classes.

Yet in another aspect, in response to measuring the input qubit, the cluster state can be reduced to a reduced cluster state that entangles a subset of the plurality of qubits including the at least one ancilla qubit and the output qubit and rotating at least one of the plurality of qubits can include, in response to measuring the input qubit, rotating the subset of the plurality of qubits according to the first measurement outcome and a first rotation parameter of the unitary operation. The rotation of the qubits based on previous measurement can allow automatic selection of optimal rotations and provide an ansatz independent approach that creates different unitary operations, hence different gate operations can be applied to separate different classes.

Yet in another aspect, rotating at least one of the plurality of qubits can include rotating a subset of the plurality of qubits that excludes the input qubit. The rotation of the qubits can provide an ansatz independent approach that creates different unitary operations, hence different gate operations can be applied to separate different classes.

A system that includes at least one processor and at least one memory device can be provided, where at least one processor can be configured to perform one or more aspects of the methods described herein.

A computer program product that includes a computer readable storage medium having program instructions embodied therewith, the program instructions readable by a device to cause the device to perform at least one or more aspect of the methods described above can be provided.

An example technical use case of the methods, systems, and computer program products described herein include machine learning applications. Machine learning models, such as classifiers, can be trained and optimized using measurement-based quantum computing, where the structure of the quantum circuit can be dynamically trained without having to have a predefined quantum machine learning model circuit.

The methods, systems, and computer program products described herein can train and optimize a machine learning model using measurement-based quantum computing techniques that can be ansatz independent, provide automatic selection of optimal unitary rotation during optimization, provide shallower circuit depth, and creates different unitary operations depending on sequential local measurements for separating different classes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as measurement-based quantum machine learning algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Quantum machine learning (QML) can combine the power of quantum computing with the principles of machine learning. In an aspect, conventional QML workflow may be implemented by circuit-based models that require pre-selection of ansatz (e.g., variational circuit components including quantum hardware and their arrangement) to perform ML tasks (e.g. classification, time-series, or the like) for a given dataset. Circuit-based models can execute a sequence of qubit rotations in a pre-defined variational wavefunction ansatz. The selection of quantum hardware and arrangement of the selected quantum hardware can influence the performance of QML applications.

Circuit-based models may require quantum hardware arrangement that has relatively deep circuit depth and current quantum hardware can be relatively noisy. One challenge of circuit-based models is that they can have relatively deep circuit depth because of a requirement to outperform classical machine learning. Also, accuracy of the QML tasks can be reduced as circuit depth increases due to the noise in quantum hardware. Other challenges of circuit-based models can include, for example, difficulty in selecting suitable ansatz for specific QML problems and difficulty of optimizing variational quantum circuit for QML models (e.g., barren plateaus issues).

Measurement-based quantum computing (MBQC) is a computational paradigm where quantum algorithms are executed by making local measurements on an entangled many-body quantum state, called a cluster state. This approach can be fundamentally different from circuit-based models. In measurement-based quantum computing, the cluster state acts as a resource, and the measurement outcomes determine the evolution of the quantum state.

In an aspect, a methodology in one embodiment can combine QML and MBQC, referred to as measurement-based quantum machine learning (MB-QML), such that QML tasks can be performed under the measurement-based framework. The methodology can create arbitrary and conditional unitary gates by sequentially measuring ancilla qubits to determine target gate operation conditionally. The measurement angles or directions of the ancilla qubits can create flexible unitary transformation that may be required by ML tasks.

An advantage of this methodology is that it can perform QML with shallower or less circuit depth via additional ancilla qubits. Further, MB-QML is ansatz independent, thus no pre-selection of ansatz is needed and the MB-QML can automatically select the best unitary rotation during optimization. Also, the methodology can create different unitary operations depending on the measurements, leading to a possibility to apply different gate operations to separate different classes. In an aspect, circuit-based models can result in isometry unitary operations (e.g., where the inner product does not change), whereas MB-QML can perform different unitary operations depending on the previous measurements.

Figure 2:
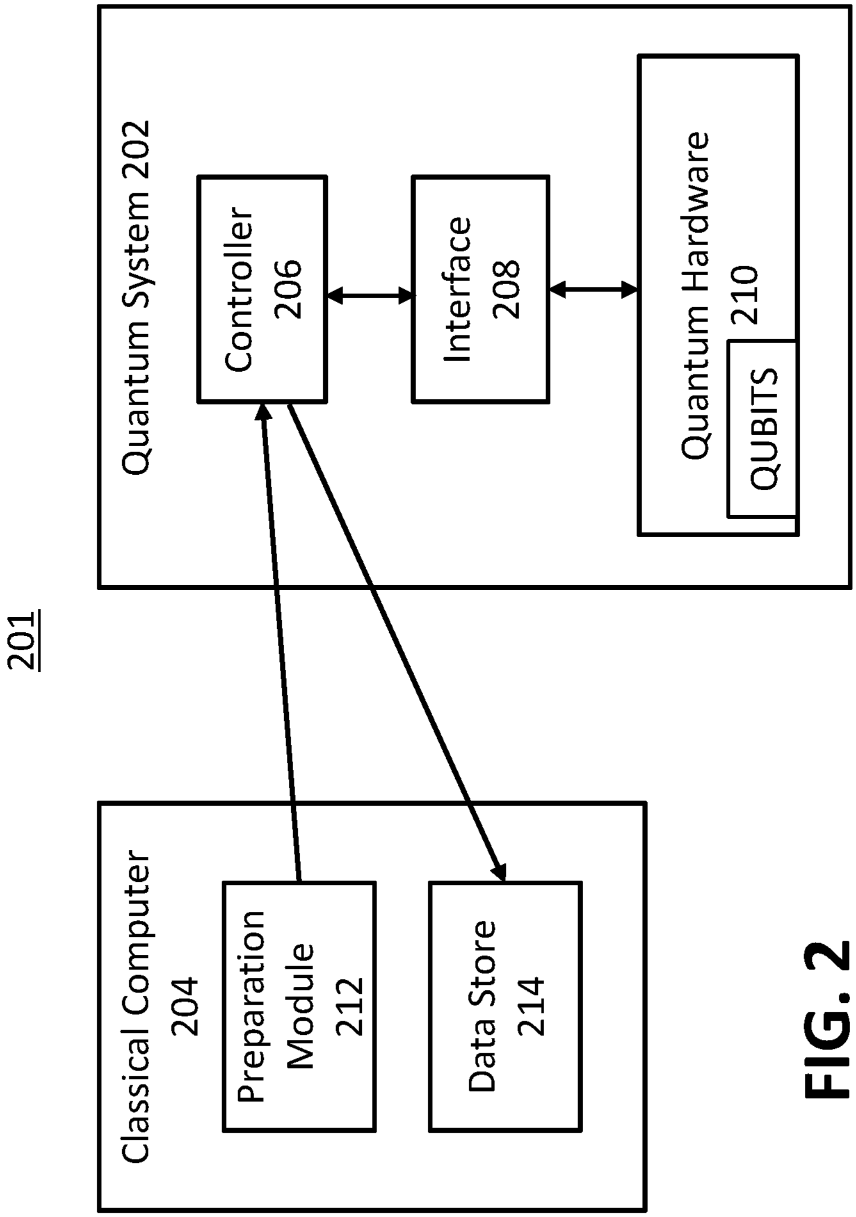
FIG. 2 is a block diagram of an example system that can provide measurement-based quantum machine learning in an embodiment.

FIG. 2 is a block diagram of an example system that can provide measurement-based quantum machine learning in an embodiment. System 201 can facilitate processing of a quantum algorithm. System 201 can be a hybrid computing system including a combination of one or more quantum computers, quantum systems, and/or classical computers. In an example shown in FIG. 2, system 201 can include a quantum system 202 and a classical computer 204. In an embodiment, quantum system 202 and classical computer 204 can be configured to be in communication via one or more of wired connections and wireless connections (e.g., a wireless network). Quantum system 202 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 204 can be electronically integrated, via any suitable wired and/or wireless electronic connection, with quantum system 202.

In the example shown in FIG. 2, quantum system 202 can be any suitable set of components capable of performing quantum operations on a physical system. A quantum operation can be, for example, a quantum gate operation that manipulate qubits to interact with one another in accordance with the quantum gate operation. In a gate-based quantum system, such quantum gate operations can implement a quantum circuit. For example, a quantum circuit can include a sequence of quantum gate operations on one or more selected qubits. In an embodiment, quantum system 202 can include a controller 206, an interface 208, and quantum hardware 210. In some embodiments, all or part of each of controller 206 (e.g., a local classical controller), interface (e.g., a classical-quantum interface) 208, and quantum hardware 210 can be located in a cryogenic environment to aid in the performance of the quantum operations. Quantum hardware 210 may be any hardware capable of using quantum states to process information. Such hardware may include a plurality of qubits and mechanisms to couple/entangle qubits in order to process information using the quantum states. A qubit can be implemented as a physical device. Examples of physical implementation of a qubit can include, but not limited to, a superconducting qubit, a trapped ion qubit, and/or others. Qubits may include, but are not limited to, charge qubits, flux qubits, phase qubits, spin qubits, and trapped ion qubits. Quantum computations can be performed by applying various quantum gates (e.g., for gate-based systems) or other operations on one or more qubits or qubit states to result in quantum states of the qubits. Quantum gates can include one or more single-qubit gates, two-qubit gates, and/or other multi-qubit gates. For example, quantum hardware 210 can be configured to perform quantum gate operations or other operations on qubits.

Controller 206 can be any combination of digital computing devices capable of providing commands for a quantum computation, such as executing a quantum circuit which may model or specify quantum operations or quantum gate operations, in combination with interface 208. Such digital computing devices may include digital processors and memory for storing and executing quantum commands using interface 208. Additionally, such digital computing devices may include devices having communication protocols for receiving such commands and sending results of the performed quantum computations to classical computer 204. Additionally, the digital computing devices may include communications interfaces with interface 208. In an embodiment, controller 206 can be configured to receive classical instructions (e.g., from classical computer 204) and convert the classical instructions into commands (e.g., command signals) for interface 208. Command signals being provided by controller 206 to interface 208 can be, for example, digital signals indicating quantum gates or other quantum operations to apply to qubits 104 to perform a specific function (e.g., measurement-based QML described herein). Interface 208 can be configured to convert these digital signals into analog signals (e.g., analog pulses such as microwave pulses) that can control the quantum hardware 210, e.g., to have one or more quantum gates or other operations act on one or more qubits to manipulate interactions between qubits.

Interface 208 can be a classical-quantum interface including a combination of devices capable of receiving commands or command signals from controller 206 and converting those commands or command signals into quantum operations for implementing on quantum hardware 210. In an embodiment, interface 208 can convert the commands from controller 206 into drive signals that can drive quantum hardware 210, e.g., manipulate qubits, e.g., control quantum gate operations on qubits. Additionally, interface 208 can be configured to convert signals received from quantum hardware 210 into digital signals capable of processing and transmitting by controller 206 (e.g., to classical computer 204). Devices included in interface 208 can include, but are not limited to, digital-to-analog converters, analog-to-digital converters, waveform generators, attenuators, amplifiers, optical fibers, lasers, and filters. Interface 208 can further include circuit components configured to measure a basis of the plurality of qubits following the implementation of quantum gates, where the measurement will yield a classical bit result. For example, a basis of $|0\rangle$ corresponds to classical bit zero, and a basis of $|1\rangle$ corresponds to classical bit one. Each measurement performed by interface 208 can be read out to a device, such as classical computer 204, connected to quantum system 202. A plurality of measurement results provided by interface 208 can result in a probabilistic outcome.

Classical computer 204 can include hardware components such as processors and storage devices (e.g., including memory devices and classical registers) for processing data encoded in classical bits. In one embodiment, classical computer 204 can be configured to control quantum system 202 by providing various control signals, commands, and data encoded in classical bits to quantum system 202. Further, quantum states measured by quantum system 202 can be read by classical computer 204 and classical computer 204 can store the measured quantum states as classical bits in classical registers. In an embodiment of an implementation, classical computer 204 can be any suitable combination of computer-executable hardware and/or computer-executable software capable of executing a preparation module 212 to perform quantum computations with data stored in data store 214 as part of building and implementing a machine learning protocol. Data store 214 may be a repository for data to be analyzed using a quantum computing algorithm, as well as the results of such analysis. Preparation module 212 may be a program or module capable of preparing classical data from data store 214 to be analyzed as part of the implementation of a quantum circuit. Preparation module 212 may be instantiated as part of a larger algorithm, such as a function call of an application programming interface (API) or by parsing a hybrid classical-quantum computation into aspects for quantum and classical calculation. Preparation module 212 may generate instructions for creating a quantum circuit using quantum gates. In an embodiment, such instructions may be stored by controller 206, and may instantiate the execution of the components of interface 208 so that the quantum operations of the quantum gates may be performed on quantum hardware 210.

Components of classical computer 204 are described in more detail above with reference to FIG. 1. In an example system, classical computer 204 can be a laptop computer, a desktop computer, a vehicle-integrated computer, a smart mobile device, a tablet device, and/or any other suitable classical computing device. Additionally or alternatively, classical computer 204 may also operate as part of a cloud computing service model, such as Software as a Service (Saas), Platform as a Service (PaaS), or Infrastructure as a Service (IaaS). Classical computer 204 may also be located in a cloud computing deployment model, such as a private cloud, community cloud, public cloud, or hybrid cloud.

System 201 can implement a measurement-based QML. The measurement-based QML implemented by system 201 can be implemented for various machine learning applications including but not limited to prediction and classification.

Figure 3:
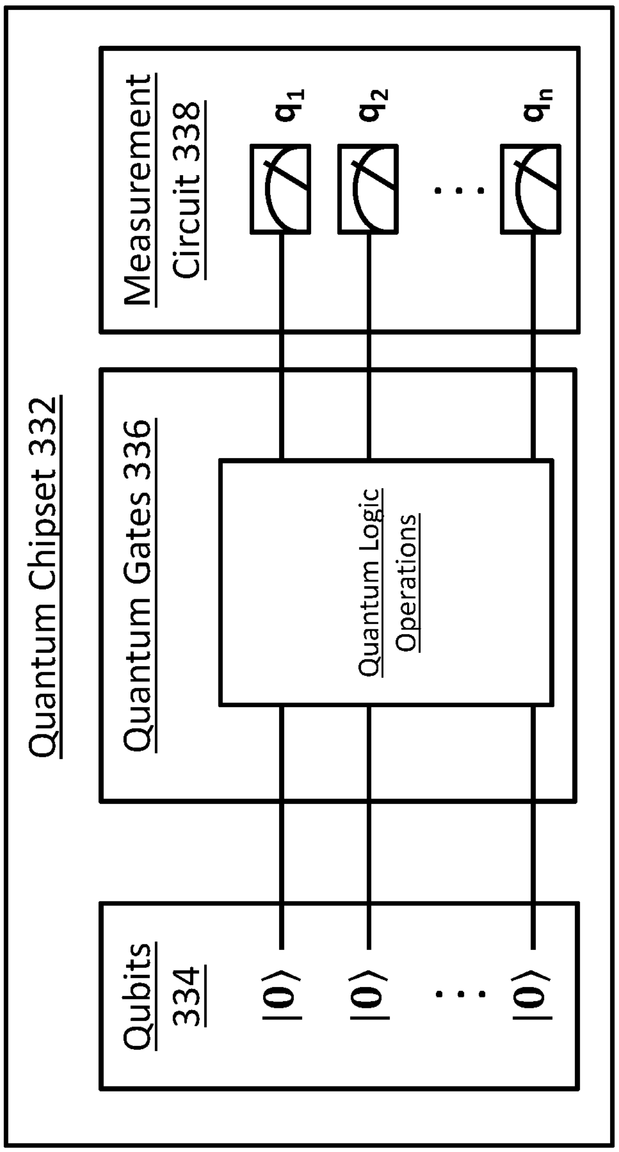
FIG. 3 illustrates a schematic of an example quantum computing system that may facilitate implementing measurement-based quantum machine learning in an embodiment.

FIG. 3 illustrates a schematic of an example quantum computing system that may facilitate implementing measurement-based quantum machine learning in an embodiment. Quantum computing system 300 can be implemented by a quantum system shown at 202 in FIG. 2. Quantum computing system 300 can include a quantum chipset 332. Quantum chipset 332 can include one or more components configured to operate on a plurality of qubits 334. For example, a quantum circuit can be implemented by components of the quantum chipset 332. In an aspect, qubits 334 can be arranged in a two-dimensional or three-dimensional array, such as being arranged in a lattice structure. A two-dimensional qubit array can be formed on a surface of a two-dimensional wafer, and the qubits 334 can be arranged in a two-dimensional lattice structure and configured to communicate with one another. A three-dimensional device array can be formed by a stack of two-dimensional wafers, and qubits 334 can be arranged in a three-dimensional lattice structure and configured to communicate with one another via connections between the two-dimensional wafers.

Quantum chipset 332 can be a quantum computing core surrounded by an infrastructure to shield quantum chipset 332 from sources of electromagnetic noise, mechanical vibration, heat, and other sources of noise, which tend to degrade performance. Magnetic shielding can be used to shield the system components from stray magnetic fields, optical shielding can be used to shield the system components from optical noise, thermal shielding and cryogenic equipment can be used to maintain the system components at controlled temperature, etc. For example, an infrastructure that can surround quantum chipset 332 can be a refrigerator that can cool the quantum chipset to an operating temperature of quantum chipset 332.

In the figure, the plurality of qubits can be denoted as q1, q2 . . . , qn. Quantum chipset 332 can operate by performing quantum logic operations (e.g., using quantum gates 336) on qubits. Quantum gates 336 can include one or more single-qubit gates and/or two-qubit gates. Quantum circuits can be formed based on quantum gates 336, and quantum chipset 332 can operate the quantum circuits to perform quantum logic operations on single qubits or conditional quantum logic operations on multiple qubits. Conditional quantum logic can be performed in a manner that entangles the qubits. Control signals can be received by quantum chipset 332, and quantum chipset 332 can use the received control signals to manipulate the quantum states of individual qubits and the joint states of multiple qubits.

Measurement interface 338 can include circuit components configured to measure a basis of qubits 334, where the basis is a measurement that will yield a classical bit result. Each measurements performed by measurement interface circuit 338 can be read out to a device (e.g., a classical computer) connected to quantum computing system 330. A plurality of measurement results provided by measurement circuit 338 can result in a probabilistic outcome.

Figure 4:
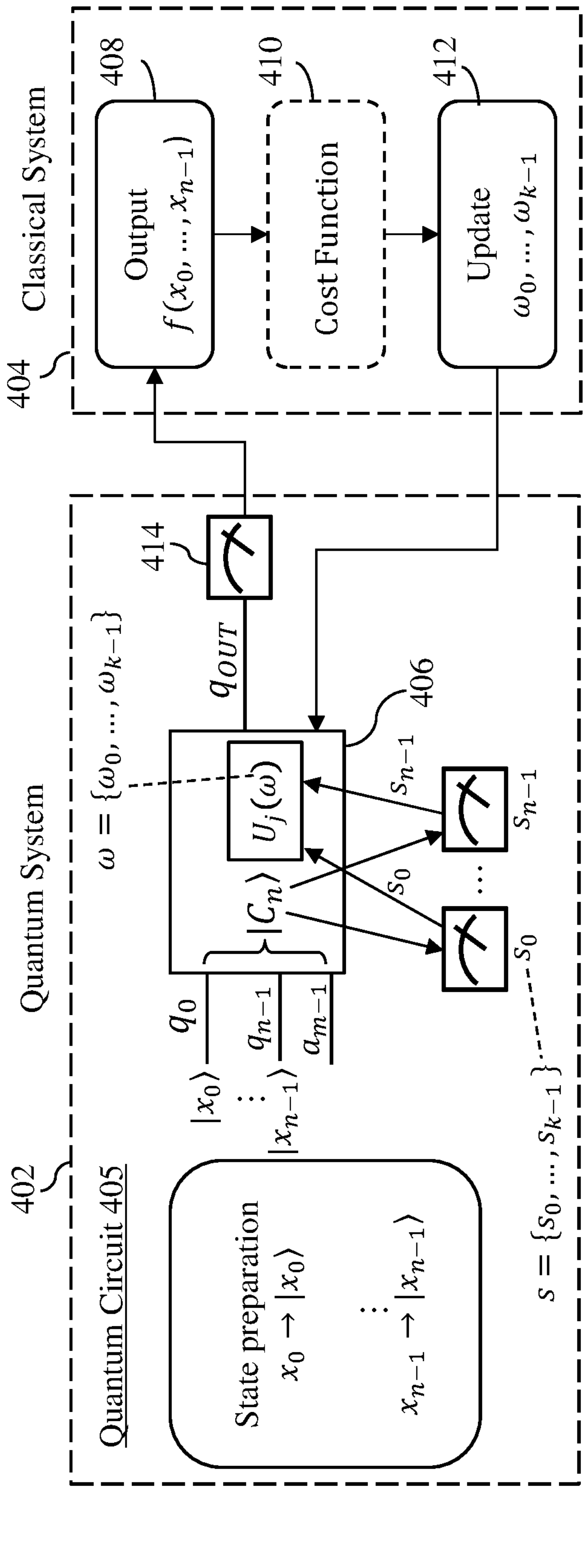
FIG. 4 is a diagram illustrating an example system that can perform measurement-based quantum machine learning in an embodiment.

FIG. 4 is a diagram illustrating an example computing platform 400 that can perform measurement-based quantum machine learning in an embodiment. Computing platform 400 can include quantum system 402 and a classical system 404. Computing platform 400 can be configured to perform measurement-based quantum machine learning (MB-QML). To implement MB-QML, classical system 404 can provide quantum system 402 with a plurality of data points, such as n data points denoted as $\{x_0, \ldots, x_{n-1}\}$, a plurality of rotation parameters $\{\omega_0, \ldots, \omega_{k-1}\}$ and a given unitary operation $U_f(\omega)$ representing a function $f(\bullet)$. The n data points can be among a plurality of data samples, such as being at least a plurality of data points in data samples or all data points in data samples. The rotation parameters $\{\omega_0, \ldots, \omega_{k-1}\}$ can be initialized to given values, or random values, and can be updated or changed for j iterations.

Quantum system 402 can include a quantum circuit 405. Quantum circuit 405 can perform state preparation to prepare qubits states or state vectors $\{|x_0\rangle, \ldots, |x_{n-1}\rangle\}$ of the data points $\{x_0, \ldots, x_{n-1}\}$. Quantum circuit 405 can include quantum logic 406 that can apply quantum logic operations on a plurality of qubits, such as n qubits denoted as $\{q_0, \ldots, q_{n-1}\}$ and a plurality of ancilla qubits, such as m ancilla qubits denoted as $\{a_0, \ldots, a_{m-1}\}$. Qubits $\{q_0, \ldots, q_{n-1}\}$ can encode the qubit states $\{|x_0\rangle, \ldots, |x_{n-1}\rangle\}$ of data points $\{x_0, \ldots, x_{n-1}\}$. The application of the quantum logic operations in quantum logic 406 can transform the input qubit states $\{|x_0\rangle, \ldots, |x_{n-1})\}$ encoded in qubits $\{q_0, \ldots, q_{n-1}\}$ into an output qubit state $U_j|x_{n-1})$ encoded in one or more output qubits such as $q_{OUT}$.

Quantum logic 406 can be configured to entangle at least one of the n qubits as an input qubit $q_{IN}$, at least one of the m ancilla qubits and output qubit $q_{OUT}$ to create a p-bit cluster state $|C_p\rangle$. Quantum logic 406 can perform sequential single-qubit local measurements on the entangled qubits in cluster state $|C_p\rangle$ to obtain q local measurement outcomes $s=\{s_0, \ldots, s_{q-1}\}$. Under the sequential single-qubit local measurement, measurement angles of ancilla qubits in cluster state $|C_p\rangle$ can be dependent on a corresponding rotation parameter ω and a previous local measurement outcome. For example, a measurement angle for ancilla qubit $a_0$ can be dependent on $\omega_1$ and $s_0$, and a measurement angle for qubit $a_1$ can be dependent on $\omega_2$ and $s_1$. The input qubit $q_{IN}$ can be measured based on predefined measurement angles, such as zero degrees or other predefined measurement angles, to obtain the first measurement outcome $s_0$. A local measurement outcome $s_i$ can determine a measurement angle for measuring a succeeding qubit in cluster state $|C_p\rangle$.

Each local measurement performed by quantum logic 406 can reduce the cluster state $|C_p\rangle$ entangling p qubits to a reduced cluster state $|C_{p-1}\rangle$ entangling p−1 qubits (e.g., the measured qubit is removed from the cluster state). The unitary operation $U_j(\omega)$ can rotate qubits that remained in the reduced cluster state $|C_{p-1}\rangle$. For example, after local measurement is performed on the input qubit $q_{IN}$, quantum logic 406 can rotate ancilla qubits $\{a_0, \ldots \omega_{m-1}\}$ and output qubit $q_{OUT}$, and after local measurement is performed on the first ancilla qubit $a_0$, quantum logic 406 can rotate ancilla qubits $\{a_1 \ldots, a_{m-1}\}$ and output qubit $q_{OUT}$. After a series of local measurement and rotations, the cluster state $|C_p\rangle$ can be reduced to the output qubit $q_{OUT}$. A measurement 414 of the output qubit $q_{OUT}$ can include measuring an output qubit state $U_j|x_{n-1}\rangle$ and classical system 404 can read the output of measurement 414 as an output 408 denoted as $f(x_0, \ldots, x_{n-1})$.

Classical system 404 can input or feed output 408 into a cost function 410. Briefly, cost function in machine learning measures the performance of a machine learning model for a data set. Cost function quantifies the error between a machine learning model's predicted values and expected values (e.g., expected value can be ground truth value) and presents that error as a numerical value or a score. Herein, cost function error is also referred to as a score. Cost function 410 can output different scores representing errors associated with different values of rotation parameters w. Some examples of cost function 410 can include mean square error, mean absolute error, cross-entropy or other types of cost functions.

Classical system 404 can tune rotation parameters w based on the error of cost function 410. By way of example, each time cost function 410 outputs an error, classical system 404 can update or tune rotation parameters ω. In one embodiment, classical system 404 can tune rotation parameters ω using optimization techniques such as gradient descent, constrained optimization by linear approximation (COBYLA), Nelder-Mead technique, or other optimization techniques. The optimization techniques being used by classical system 404 can determine, for example, how much to adjust rotation parameters w to change rotation angles. Quantum logic 406 can operate on qubits $\{q_0, \ldots, q_{n-1}\}$, ancilla qubits $\{a_0, \ldots, a_{m-1}\}$ and output qubit $q_{OUT}$ using the updated rotation parameters w to generate a new output, and cost function 410 can generate a new error based on the new output. Computing platform 400 can perform this iterative process of operating quantum logic 406 with different rotation parameters ω until the error outputted by cost function 410 converges to a predefined threshold or predefined minimum error. By way of example, this predefined threshold can be zero, or close to zero. In response to the error of cost function 410 converging to the predefined threshold, classical system 404 may not update the values of rotation parameters w and may set the most recent values of rotation parameters w as final and optimal values. The optimization of rotation parameters ω also optimizes the measurement angles of the qubits since the measurement angles are dependent on local measurement outcomes s and rotation parameters ω

By way of example, quantum system 402 can generate j different unitary operations $U_j(\omega)$. For a j-th iteration, quantum system 402 can create a unitary operation $U_j(\omega)$ using a j-th set of rotation parameters ω. Classical system 404 can perform an update 412 to update the j-th set of rotation parameters ω into a (j+1)-th set of rotation parameters ω. Classical system 404 can provide the (j+1)-th set of rotation parameters ω to quantum logic 406. Quantum logic 406 can perform sequential local measurements on cluster state $|C_n\rangle$ to obtain a (j+1)-th set of local measurement outcomes s. The (j+1)-th set of local measurement outcomes s can determine new measurement angles for measuring ancilla qubits $\{a_0, \ldots, a_{m-1}\}$. The (j+1)-th set of local measurement outcomes s can also alter rotation directions of the (j+1)-th set of rotation parameters ω. The (j+1)-th set of local measurement outcomes s and the (j+1)-th set of rotation parameters ω can create a (j+1)-th unitary operation $U_{j+1}(\omega)$.

In one embodiment, unitary operation $U_j(\omega)$ can represent a given machine learning task or machine learning model $f(\bullet)$. The tuning of rotation parameters ω using unitary operations $U_j(\omega)$ created by local measurement outcomes s can effectively train the given machine learning model. For example, unitary operation $U_j(\omega)$ can be a classification model for classifying data into different classes and rotation parameters ω, where $\omega=\{\omega_0, \ldots, \omega_{k-1}\}$ can be class weights for k different features being used for the classification. Data points $\{x_0, \ldots, x_{n-1}\}$ can be a set of training data for training the machine learning model represented by unitary operation $U_j(\omega)$. Computing platform 400 can be configured to train the given machine learning model by tuning the rotation parameters ω, which is tuning of the class weights in the given machine learning model. The unitary operation $U_j(\omega)$ with the optimal values of rotation parameters ω can be deployed for performing machine learning task of the given machine learning model.

By using local measurement outcomes s to create arbitrary unitary operations U_j (ω) for training a machine learning model, pre-selection of variational quantum circuit components are not needed for the training. Further, the local measurements on the cluster state can be performed on individual qubits sequentially. The implementation of the sequential local measurement can utilize shallower circuit depth when compared to circuit-based models that uses ansatz of variational quantum circuit components.

Figure 5:
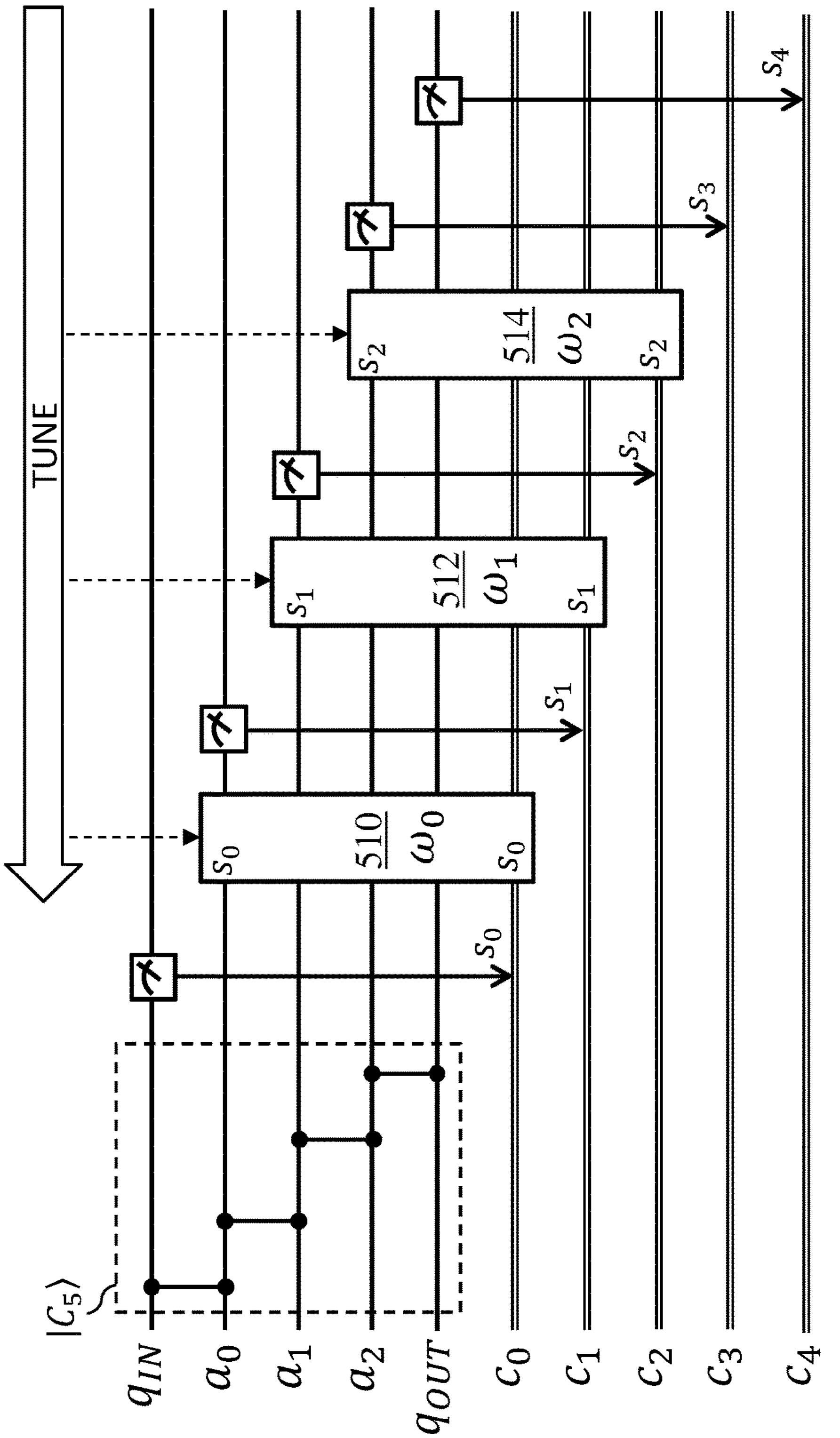
FIG. 5 is a diagram illustrating an example quantum circuit that can implement measurement-based quantum machine learning in an embodiment.

FIG. 5 is a diagram illustrating an example quantum circuit that can implement measurement-based quantum machine learning in an embodiment. A quantum circuit 500 is shown in FIG. 5. Quantum circuit 500 can be an example of quantum logic 406 shown in FIG. 4. In the example shown in FIG. 5, five qubits $q_{IN}$, $a_0$, $a_1$, $a_2$, $q_{OUT}$ can be inputted into quantum circuit 500. Additionally, quantum circuit 500 can include five classical bits $c_0$, $c_1$, $c_2$, $c_3$, $c_4$ for storing local measurement outcomes s of qubits $q_0$, $q_1$, $q_2$, $q_3$, $q_4$. Quantum circuit 500 can include a plurality of quantum logic gates, such as Pauli gates and rotation gates (e.g., conditional rotation gates). By way of example, quantum circuit 500 can include p−1 Pauli Z gates, or controlled-Z gates, that can entangle p qubits to create cluster state $|C_p\rangle$. In the example shown in FIG. 5, quantum circuit 500 can include four controlled-Z gates that entangles qubits $q_{IN}$, $a_0$, $a_1$, $a_2$, $q_{OUT}$ to form cluster state $|C_5\rangle$.

Quantum circuit 500 can further include one or more conditional rotation gates, such as conditional rotation gates 510, 512, 514. Each one of the conditional rotation gates in quantum circuit 500 can be configured to rotate at least one of the qubits $q_{IN}$, $a_0$, $a_1$, $a_2$, $q_{OUT}$ according to a rotation angle defined by one of the rotation parameters ω and at least one of the local measurement outcomes s. By way of example, conditional rotation gate 510 can rotate qubits based on at least $s_0$, $\omega_0$, conditional rotation gate 512 can rotate qubits based on at least $s_1$, $\omega_1$ and conditional rotation gate 510 can rotate qubits based on at least $s_2$, $\omega_2$, By way of example, a single-qubit local measurement can be performed on cluster state $|C_5\rangle$ to measure qubit $q_{IN}$. The measurement on qubit $q_{IN}$ can result in a measurement outcome $s_0$. Measurement outcome $s_0$ can be provided, via classical bit $c_0$, to conditional rotation gate 510 to define a measurement angle for measuring a qubit sequential to, or succeeding the measured qubit $q_{IN}$, such as ancilla qubit $a_0$. Note that after obtaining measurement outcome $s_0$, cluster state $|C_5\rangle$ can be reduced to $|C_4\rangle$ entangling qubits $a_0$, $a_1$, $a_2$, $q_{OUT}$. Measurement outcome $s_0$ can also be provided to conditional rotation gate 510 and conditional rotation gate 510 can rotate qubits $q_{IN}$, $a_0$, $a_1$, $a_2$, $q_{OUT}$ according to $s_0$, $\omega_0$. In one embodiment, the local measurement outcomes resulting from single-qubit measurements of cluster state $|C_5\rangle$ can be a binary result (e.g., 0 or 1). A first measurement result of so may not change rotation parameter $\omega_0$ and conditional rotation gate 510 can rotate qubits $a_0$, $a_1$, $a_2$, $q_{OUT}$ according to $\omega_0$. A second measurement result of $s_0$ may change rotation parameter $\omega_0$, such as flipping $\omega_0$, and conditional rotation gate 510 can rotate qubits $a_0$, $a_1$, $a_2$, $q_{OUT}$ according to $-\omega_0$.

Another single-qubit local measurement can be performed on cluster state $|C_4\rangle$ to measure ancilla qubit $a_0$. The measurement on ancilla qubit $a_0$ can result in a measurement outcome $s_1$. Measurement outcome $s_1$ can be provided, via classical bit $c_1$, to conditional rotation gate 512 to define a measurement angle for measuring a qubit sequential to, or succeeding the measured qubit $a_0$, such as ancilla qubit $a_1$. Note that after obtaining measurement outcome $s_1$, cluster state $|C_4\rangle$ can be reduced to $|C_3\rangle$ entangling qubits $a_1$, $a_2$, $q_{OUT}$. Measurement outcome $s_1$ can also be provided to conditional rotation gate 512 and conditional rotation gate 512 can rotate qubits $a_1$, $a_2$, $q_{OUT}$ according to $s_1$, $\omega_1$. In one embodiment, the local measurement outcomes resulting from single-qubit measurements of cluster state $|C_4\rangle$ can be a binary result (e.g., 0 or 1). A first measurement result of $s_1$ may not change rotation parameter $\omega_1$ and conditional rotation gate 512 can rotate qubits $a_1$, $a_2$, $q_{OUT}$ according to $\omega_1$. A second measurement result of $s_1$ may change rotation parameter $\omega_1$, such as flipping $\omega_1$, and conditional rotation gate 512 can rotate qubits $a_1$, $a_2$, $q_{OUT}$ according to $-\omega_1$.

Quantum circuit 500 can continue to perform local measurement on the qubits sequentially until the cluster state is reduced to $|C_2\rangle$ entangling $\omega_2$, $q_{OUT}$. In the example shown in FIG. 5, in response to conditional rotation gate 514 rotating the last two qubits $a_2$, $q_{OUT}$, qubit $a_2$ can be measured based on measurement angle defined by $s_2$, the final cluster state $|C_2\rangle$ can be broken and the output qubit $q_{OUT}$ remains. If input qubit $q_{IN}$ encodes $|x_4\rangle$, the output state of the output qubit $q_{OUT}$ can be an output state $U_j|x_4\rangle$ and final measurement of the output state $U_j|x_4\rangle$ can be performed to output $f(x_4)$ Referring to FIG. 4, classical system 402 can obtain this final measurement and tune rotation parameters $\omega_0$, $\omega_1$, $\omega_2$ based on cost function 410. In response to tuning rotation parameters $\omega_0$, $\omega_1$, $\omega_2$ that causes the error of $f(x_4)$ to converge to a target error or minimum error, the tuned rotation parameters can be set as weights for function $f(x_4)$ that can provide optimal prediction on an input $x_4$.

Figure 6:
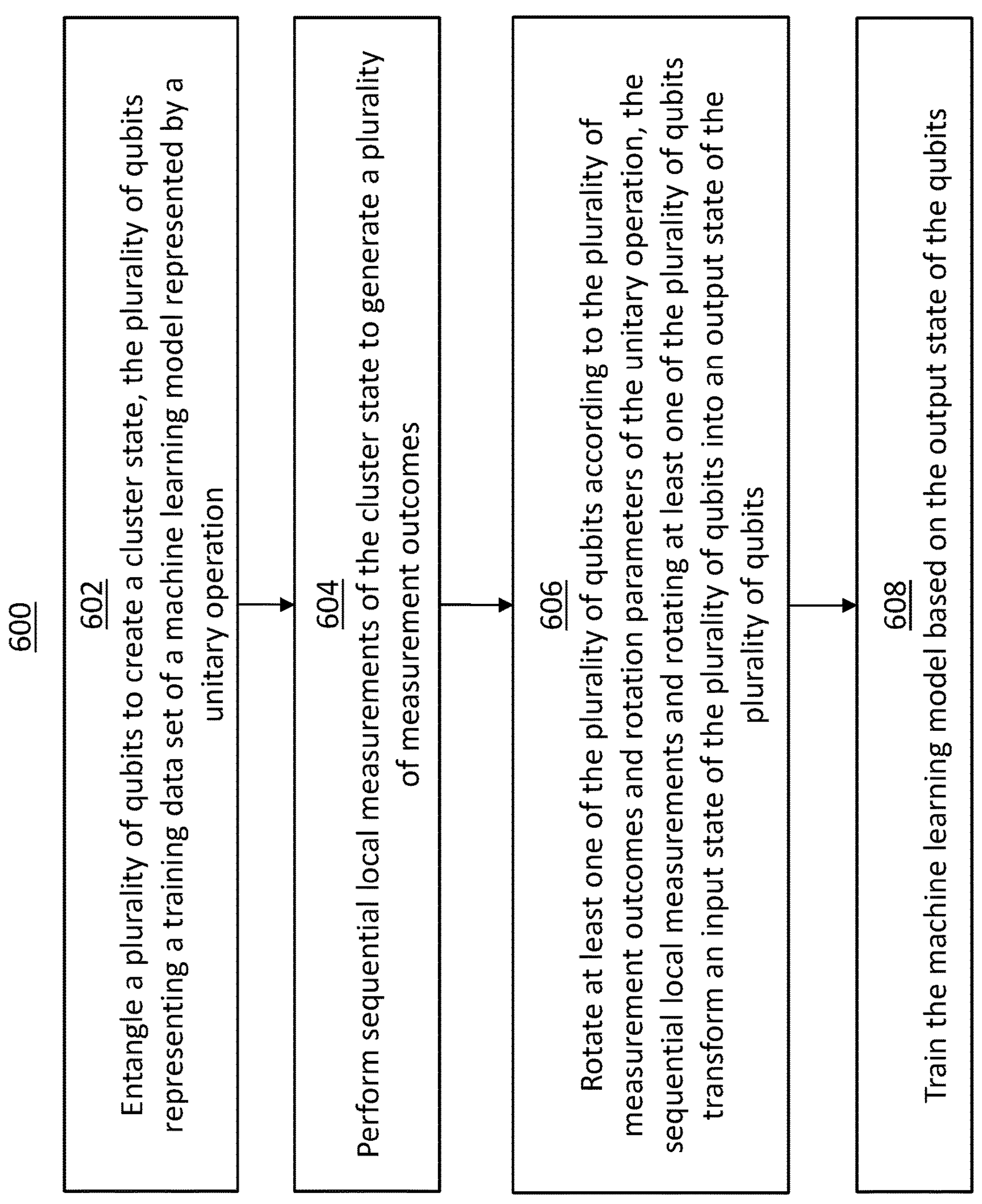
FIG. 6 illustrates a flow diagram relating to measurement-based quantum machine learning in an embodiment.

FIG. 6 illustrates a flow diagram relating to measurement-based quantum machine learning in an embodiment. The process 600 in FIG. 6 may be implemented using, for example, one or more of computing environment 100, system 201, quantum computing system 300, or computing platform 400 discussed above. An example process may include one or more operations, actions, or functions as illustrated by one or more of blocks 602, 604, 606 and/or 608. Although illustrated as discrete blocks, various blocks may be divided into additional blocks, combined into fewer blocks, eliminated, performed in different order, or performed in parallel, depending on the desired implementation.

Process 600 can begin at block 602. At block 602, quantum hardware can entangle a plurality of qubits to create a cluster state. The plurality of qubits can include at least an input qubit, an output qubit, and at least one ancilla qubit. The input qubit can represent data among a training data set of a machine learning model represented by a unitary operation. In one embodiment, the quantum hardware can entangle the plurality of qubits using a plurality of controlled-Z gates to entangle the plurality of qubits.

Process 600 can proceed from block 602 to block 604. At block 604, the quantum hardware can perform sequential local measurements of the cluster state to generate a plurality of measurement outcomes. In one embodiment, the quantum hardware can perform the sequential local measurement of the cluster state by measuring the input qubit to obtain a first measurement outcome and measuring a first ancilla qubit among the at least one ancilla qubit to obtain a second measurement outcome. The first ancilla qubit can be measured using a measurement angle that depends on the first measurement outcome and the first ancilla qubit succeeds the input qubit in the cluster state.

Process 600 can proceed from block 604 to block 606. At block 606, a processor can control the quantum hardware can rotate at least one of the plurality of qubits according to the plurality of measurement outcomes and rotation parameters of the unitary operation. The sequential local measurements and rotating at least one of the plurality of qubits can transform an input state of the input qubit into an output state of the output qubit. In one embodiment, in response to measuring the input qubit, the cluster state is reduced to a reduced cluster state that entangles a subset of the plurality of qubits including the at least one ancilla qubit and the output qubit. In response to measuring the input qubit, The quantum hardware can rotate the subset of the plurality of qubits according to the first measurement outcome and a first rotation parameter of the unitary operation. In one embodiment, the quantum hardware can rotate a subset of the plurality of qubits that excludes the input qubit.

Process 600 can proceed from block 606 to block 608. At block 608, the processor can train the machine learning model based on the output state of the output qubit. In one embodiment, the processor can train the machine learning model by optimizing the rotation parameters of the unitary operation. In one embodiment, the processor can optimize the rotation parameters comprises by measuring the output state of the output qubit to obtain an output, using a cost function to determine a score associated with the output, and tuning the rotation parameters of the unitary operation based on the score.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

entangling a plurality of qubits to create a cluster state, wherein the plurality of qubits includes at least an input qubit, an output qubit, and at least one ancilla qubit, the input qubit represents data among a training data set of a machine learning model represented by a unitary operation;

performing sequential local measurements of the cluster state to generate a plurality of measurement outcomes, wherein the sequential local measurements begin at a measurement of the input qubit;

rotating at least one of the plurality of qubits according to the plurality of measurement outcomes and rotation parameters of the unitary operation, wherein the sequential local measurements and rotating at least one of the plurality of qubits transform an input state of the input qubit into an output state of the output qubit; and training the machine learning model based on the output state of the output qubit.

2. The computer-implemented method of claim 1, wherein training the machine learning model comprises optimizing the rotation parameters of the unitary operation.

3. The computer-implemented method of claim 2, wherein optimizing the rotation parameters comprises:

measuring the output state of the output qubit to obtain an output;

using a cost function to determine a score associated with the output; and tuning the rotation parameters of the unitary operation based on the score.

4. The computer-implemented method of claim 1, wherein entangling the plurality of qubits to create the cluster state comprises using a plurality of controlled-Z gates to entangle the plurality of qubits.

5. The computer-implemented method of claim 1, wherein performing the sequential local measurement of the cluster state comprises:

measuring the input qubit to obtain a first measurement outcome; and measuring a first ancilla qubit among the at least one ancilla qubit to obtain a second measurement outcome, wherein the first ancilla qubit is measured using a measurement angle that depends on the first measurement outcome and the first ancilla qubit succeeds the input qubit in the cluster state.

6. The computer-implemented method of claim 5, wherein:

in response to measuring the input qubit, the cluster state is reduced to a reduced cluster state that entangles a subset of the plurality of qubits including the at least one ancilla qubit and the output qubit; and rotating at least one of the plurality of qubits comprises, in response to measuring the input qubit, rotating the subset of the plurality of qubits according to the first measurement outcome and a first rotation parameter of the unitary operation.

7. The computer-implemented method of claim 1, wherein rotating at least one of the plurality of qubits comprises rotating a subset of the plurality of qubits that excludes the input qubit.

8. A computer program product comprising a computer readable storage medium having program instructions embodied therewith, the program instructions readable by a device to cause the device to:

entangle a plurality of qubits to create a cluster state, wherein the plurality of qubits includes at least an input qubit, an output qubit, and at least one ancilla qubit, the input qubit represents data among a training data set of a machine learning model represented by a unitary operation;

perform sequential local measurements of the cluster state to generate a plurality of measurement outcomes, wherein the sequential local measurements begin at a measurement of the input qubit;

rotate at least one of the plurality of qubits according to the plurality of measurement outcomes and rotation parameters of the unitary operation, wherein the sequential local measurements and rotation of at least one of the plurality of qubits transform an input state of the input qubit into an output state of the output qubit; and train the machine learning model based on the output state of the output qubit.

9. The computer program product of claim 8, wherein the device is further caused to perform optimization of the rotation parameters of the unitary operation to train the machine learning model.

10. The computer program product of claim 9, wherein the device is further caused to:

measure the output state of the output qubit to obtain an output;

use a cost function to determine a score associated with the output; and tune the rotation parameters of the unitary operation based on the score.

11. The computer program product of claim 8, wherein the device is further caused to entangle the plurality of qubits using a plurality of controlled-Z gates.

12. The computer program product of claim 8, wherein to perform the sequential local measurement of the cluster state, the device is further caused to:

measure the input qubit to obtain a first measurement outcome; and measure a first ancilla qubit among the at least one ancilla qubit to obtain a second measurement outcome, wherein the first ancilla qubit is measured using a measurement angle that depends on the first measurement outcome and the first ancilla qubit succeeds the input qubit in the cluster state.

13. The computer program product of claim 12, wherein:

in response to measurement of the input qubit, the cluster state is reduced to a reduced cluster state that entangles a subset of the plurality of qubits including the at least one ancilla qubit and the output qubit; and in response to measurement of the input qubit, rotate the subset of the plurality of qubits according to the first measurement outcome and a first rotation parameter of the unitary operation.

14. The computer program product of claim 8, wherein to rotate at least one of the plurality of qubits, the device is further caused to rotate a subset of the plurality of qubits that excludes the input qubit.

15. A system comprising:

at least one processor; and quantum hardware including a plurality of qubits, the quantum hardware being configured to:

entangle a plurality of qubits to create a cluster state, wherein the plurality of qubits includes at least an input qubit, an output qubit, and at least one ancilla qubit, the input qubit represents data among a training data set of a machine learning model represented by a unitary operation;

perform sequential local measurements of the cluster state to generate a plurality of measurement outcomes, wherein the sequential local measurements begin at a measurement of the input qubit; and rotate at least one of the plurality of qubits according to the plurality of measurement outcomes and rotation parameters of the unitary operation;

the at least one processor being configured to:

control the quantum hardware to transform an input state of the input qubit into an output state of the output qubit; and train the machine learning model based on the output state of the output qubit.

16. The system of claim 15, wherein the at least one processor is configured to:

measure the output state of the output qubit to obtain an output;

use a cost function to determine a score associated with the output; and tune the rotation parameters of the unitary operation based on the score to optimize the rotation parameters of the unitary operation.

17. The system of claim 15, wherein the quantum hardware comprises a plurality of controlled-Z gates configured to entangle the plurality of qubits to create the cluster state.

18. The system of claim 15, wherein performing the sequential local measurement of the cluster state comprises:

measuring the input qubit among the plurality of qubits to obtain a first measurement outcome; and measuring a first ancilla qubit among the at least one ancilla qubit to obtain a second measurement outcome, wherein the first ancilla qubit is measured using a measurement angle that depends on the first measurement outcome and the first ancilla qubit succeeds the input qubit in the cluster state.

19. The system of claim 18, wherein:

in response to measurement of the input qubit, the cluster state is reduced to a reduced cluster state that entangles a subset of the plurality of qubits including the at least one ancilla qubit and the output qubit; and the quantum hardware is configured to, in response to measuring the input qubit, rotate the subset of the plurality of qubits according to the first measurement outcome and a first rotation parameter of the unitary operation.

20. The system of claim 15, wherein the quantum hardware is configured to rotate a subset of the plurality of qubits that excludes the input qubit.

* * * * *